United States Patent [19]

Mark

[11] Patent Number: 4,663,421
[45] Date of Patent: May 5, 1987

[54] POLYARYLATE HAVING AMIDE TERMINAL GROUPS

[75] Inventor: Victor Mark, Evansville, Ind.
[73] Assignee: General Electric Company, Mt. Vernon, Ind.
[21] Appl. No.: 550,813
[22] Filed: Nov. 14, 1983
[51] Int. Cl.⁴ ............................................. C08G 63/20
[52] U.S. Cl. .................................... 528/176; 528/182; 528/193; 528/194
[58] Field of Search ................ 528/176, 182, 193, 194
[56] References Cited

U.S. PATENT DOCUMENTS 3,028,364  4/1962  Conix et al. ........................ 528/182
3,234,168  2/1966  Hare ................................... 528/182
3,910,860 10/1975  Tanikella ............................ 528/182
4,322,521  3/1982  Williams ............................. 528/182
4,412,057 10/1983  Asada et al. ....................... 528/182
4,506,064  3/1985  Mark .................................. 528/176

Primary Examiner—Harold D. Anderson
Attorney, Agent, or Firm—Myron B. Kapustij; Martin B. Barancik

[57] ABSTRACT

Polyarylates having amide terminal groups are prepared using a terminating amount of ammonia, ammonium compounds, primary amines, secondary amines, hydrogen ammonium salts of secondary amines, or hydrogen ammonium salts of primary amines. These amide terminated polyarylates exhibit improved thermal properties and are useful in the production of films and molded articles.

4 Claims, No Drawings

POLYARYLATE HAVING AMIDE TERMINAL GROUPS

BACKGROUND OF THE INVENTION

Polyarylates are high molecular weight thermoplastic resins which due to their many advantageous properties are finding increasing use as engineering thermoplastic materials in many commercial and industrial applications. Polyarylates are generally linear aromatic polymers containing repeating aromatic ester structural units in the polymer chain. The polyarylates are in general derived from dihydric phenols and aromatic dicarboxylic acids or their reactive derivatives.

While conventional polyarylates are in general quite suitable for a wide variety of uses, there nevertheless exists a need, especially in high temperature environments, for polyarylates exhibiting, to a substantial degree, most of the advantageous properties of conventional polyarylates while simultaneously exhibiting improved thermal stability.

It is, therefore, an object of the instant invention to provide polyarylates exhibiting improved thermal stability.

SUMMARY OF THE INVENTION

In accordance with the instant invention there are provided polyarylates containing at least one amide terminal group. The instant polyarylates are prepared by reacting (i) at least one aromatic dicarboxylic acid or a reactive derivative thereof, (ii) at least one dihydric phenol, and (iii) a terminating amount of at least one amide precursor.

DESCRIPTION OF THE INVENTION

In accordance with the instant invention there are provided amide terminated polyarylates exhibiting improved thermal stability. These polyarylates are derived from (i) at least one aromatic dicarboxylic acid or a reactive derivative thereof, (ii) at least one dihydric phenol, and (iii) a terminating amount of at least one amide precursor.

The dihydric phenols employed in the practice of the instant invention are the known conventional dihydric phenols. These dihydric phenols may be represented by the general formula

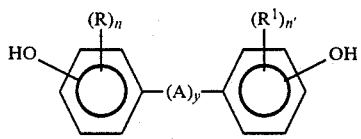

I.

wherein:
R is independently selected from monovalent hydrocarbon radicals, halogen radicals, and monovalent hydrocarbonoxy radicals
$R^1$ is independently selected from monovalent hydrocarbon radicals, halogen radicals, and monovalent hydrocarbonoxy radicals;
n and n' are independently selected from positive integers having a value of from 0 to 4 inclusive;
y is either zero or one; and
A is selected from divalent hydrocarbon radicals, —S—, —S—S—,

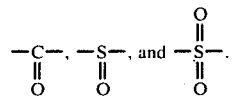

The divalent hydrocarbon radicals represented by A are selected from alkylene radicals, cycloalkylene radicals, alkylidene radicals, and cycloalkylidene radicals. Preferred alkylene radicals are those containing from 2 to about 7 carbon atoms. Preferred cycloalkylene radicals are those containing from 4 to about 7 ring carbon atoms. Preferred alkylidene radicals are those containing from 1 to about 7 carbon atoms. Preferred cycloalkylidene radicals are those containing from 4 to about 7 ring carbon atoms.

The monovalent hydrocarbon radicals represented by R and $R^1$ are selected from alkyl radicals, cycloalkyl radicals, aryl radicals, aralkyl radicals, and alkaryl radicals.

Preferred alkyl radicals represented by R and $R^1$ are those containing from 1 to about 8 carbon atoms. Some illustrative non-limiting examples of these alkyl radicals include methyl, ethyl, propyl, isopropyl, butyl, tertiarybutyl, pentyl, neopentyl, and hexyl.

Preferred cycloalkyl radicals represented by R and $R^1$ are those containing from 4 to about 7 ring carbon atoms. Some illustrative non-limiting examples of these cycloalkyl radicals include cyclobutyl, cyclohexyl, cyclopentyl, and methylcyclohexyl.

Preferred aryl radicals represented by R and $R^1$ are those containing from 6 to 12 carbon atoms. These include phenyl, naphthyl, and biphenyl.

Preferred aralkyl and alkaryl radicals represented by R and $R^1$ are those containing from 7 to about 14 carbon atoms. Some illustrative non-limiting examples of these aralkyl and alkaryl radicals include ethylphenyl, propylphenyl, benzyl, tolyl, pentylphenyl, methylnaphthyl, phenethyl, and phenylpropyl.

The preferred halogen radicals represented by R and $R^1$ are chlorine and bromine.

The monovalent hydrocarbonoxy radicals represented by R and $R^1$ may be represented by the general formula —$OR^2$ wherein $R^2$ represents a monovalent hydrocarbon radical of the type described hereinafore for R and $R^1$.

In the dihydric phenol compounds of Formula I when y is zero the aromatic nuclear residues are directly joined with no intervening alkylene or other bridge. When more than one R substituent is present they may be the same or different. The same is true for the $R^1$ substituent. The positions of the hydroxyl groups and R or $R^1$ on the aromatic nuclear residues may be varied in the ortho, meta or para positions and the groupings can be in a vicinal, asymmetrical or symmetrical relationship where two or more ring carbon atoms of the aromatic nuclear residue are substituted with R or $R^1$ and hydroxyl group.

Particularly useful dihydric phenols of Formula I are those wherein n and n' are zero, and those wherein R and $R^1$ are independently selected from alkyl radicals.

Some illustrative non-limiting examples of dihydric phenols of Formula I include:
2,2-bis(4-hydroxyphenyl)propane (bisphenol-A);
1,3-bis(3-methyl-4-hydroxyphenyl)propane;
2,2-bis(4-hydroxphenyl)butane;
2,2-bis(3-phenyl-4-hydroxyphenyl)propane;

1,1-bis(4-hydroxyphenyl)cyclohexane;
2,2-bis(3,5-dimethyl-4-hydroxyphenyl)propane;
4,4'-dihydroxydiphenyl;
4,4'-thiodiphenol;
2,2-bis(3-bromo-4-hydroxyphenyl)propane;
2,2-bis(3,5-dibromo-4-hydroxyphenyl)propane; and
bis(4-hydroxyphenyl)ether.

It is, of course, possible to utilize mixtures of two or more dihydric phenols, as well as individual diphenols. Therefore, wherever the term dihydric phenol is used herein it is meant to include mixtures of two or more different dihydric phenols as well as individual dihydric phenols.

The aromatic dicarboxylic acids which are reacted with at least one dihydric phenol of Formula I to produce the polyarylates of the instant invention are well known and are generally commercially available or may readily be prepared by known methods. In general, any aromatic dicarboxylic acid conventionally used in the preparation of polyesters may be utilized. These aromatic carboxylic acids may be represented by the general formula

$$HOOC-Ar-COOH \qquad II.$$

wherein Ar is selected from divalent aromatic radicals and substituted divalent aromatic radicals, preferably those containing from 6 to 12 ring carbon atoms such as phenylene, naphthylene, biphenylene, substituted phenylene, substituted naphthylene, and substituted biphenylene. These divalent aromatic radicals when susbtituted are preferably substituted with monovalent hydrocarbon radicals of the type described hereinafore and halogen radicals, preferably chlorine and bromine. In Formula II Ar may also be selected from divalent radicals of the type $-Ar'-R^3-Ar'-$ wherein Ar is independently selected from divalent aromatic radicals of the type described for Ar, and $R^3$ is independently selected from alkylene radicals, preferably those containing from 2 to about 7 carbon atoms, and alkylidene radicals, perferably those containing from 1 to about 7 carbon atoms.

Preferred aromatic dicarboxylic acids of Formula II are those represented by the general formula

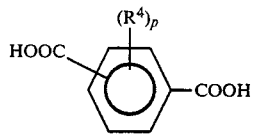

III.

wherein $R^4$ is independently selected from alkyl radicals, preferably those containing from 1 to about 6 carbon atoms, and halogen radicals, preferably chlorine and bromine; and p represents a positive integer having a value of from 0 to 4 inclusive. In Formula III when more than one $R^4$ substituent is present they may be the same or different.

Some illustrative non-limiting examples of aromatic dicarboxylic acids represented by Formula III include phthalic acid, isophthalic acid, and terephthalic acid.

It is possible, in preparing the polyarylates of the instant invention, to use only one aromatic dicarboxylic acid or to employ a mixture of two or more different aromatic dicarboxylic acids. Therefore, wherever the term aromatic dicarboxylic acid is used herein it is meant to include individual aromatic dicarboxylic acids as well as mixtures of different aromatic dicarboxylic acids.

Instead of using the aromatic dicarboxylic acids per se it is possible, and sometimes even preferred, to employ their respective ester forming reactive derivatives. These ester forming reactive derivatives of the aromatic dicarboxylic acids are well known and are generally commercially available or may be readily prepared by known methods. Particularly useful ester forming reactive derivatives of the aromatic dicarboxylic acids are the acid dihalides, with the acid dichlorides being the preferred acid dihalides. Thus, for example, instead of utilizing isophthalic acid, terephthalic acid, or mixtures thereof, which are particularly useful aromatic dicarboxylic acids, it is possible to employ isophthaloyl dichloride, terephthaloyl dichloride, or mixtures thereof.

The amide precursors are compounds that form amide terminal groups on the polyarylate polymers. These amide terminal groups are represented by the general formula

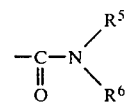

IV.

wherein $R^5$ and $R^6$ are independently selected from hydrogen, alkyl, cycloalkyl, aryl, aralkyl, and alkaryl radicals.

The preferred alkyl radicals are those containing from 1 to about 18 carbon atoms. Illustrative of these alkyl radicals are methyl, ethyl, propyl, isopropyl, butyl, tertiarybutyl, pentyl, neopentyl, decyl, dodecyl, and the like.

The preferred cycloalkyl radicals are those containing from 4 to about 7 ring carbon atoms.

The preferred aryl radicals are those containing from 6 to 12 ring carbon atoms. These include phenyl, naphthyl and biphenyl.

The preferred aralkyl and alkaryl radicals are those containing from 7 to about 14 carbon atoms.

The amide precursors that form the amide terminal groups of Formula IV include ammonia, ammonium compounds that liberate ammonia under the polyarylate forming reaction conditions, primary amines, secondary amines, hydrogen ammonium salts of primary amines which liberate primary amines under the polyarylate forming reaction conditions, and hydrogen ammonium salts of secondary amines which liberate secondary amines under the polyarylate forming reaction conditions.

The primary amines include the aliphatic amines and the aromatic amines. Some illustrative non-limiting examples of suitable primary amines include methyl amine, ethyl amine, n-butyl amine, tertiarybutyl amine, cyclohexyl amine, aniline, ethylaniline, and benzyl amine.

The secondary amines include the aliphatic secondary amines, the aromatic secondary amines, and the aliphatic-aromatic secondary amines. Some illustrative non-limiting examples of these secondary amines include dimethyl amine, diethyl amine, methyl ethyl amine, dibutyl amine, cyclohexyl ethyl amine, N-cyclohexyl aniline, N-ethyl aniline, methyl ethylphenyl amine, and the like.

Suitable examples of ammonium compounds that liberate ammonia under the polyarylate forming reaction conditions include ammonium hydroxide, ammonium carbonate, ammonium sulfite, ammonium phosphate, and the like.

Suitable examples of hydrogen ammonium salts of primary and secondary amines which liberate primary and secondary amines under the polyarylate forming reaction conditions include, but are not limited to, methylamine hydrochloride, isopropylamine hydrochloride, cyclohexylamine hydrogen sulfate, dimethylamine hydrochloride, tertiarybutyl cyclohexylamine hydrobromide, and phenyl methylamine hydrochloride.

The amide precursors function as endcapping or chain terminating agents serving to control or regulate the molecular weight of the polyarylates in the process of the instant invention. The amide precursors form amide terminal groups on the ends of the arylate polymer chain. The amide precursors are added to the polyarylate formation process so that their presence can influence the length of the polymer chain and, therefore, the molecular weight of the polyarylate. The weight average molecular weight of the arylate polymers is generally controlled by the use of the amide precursors in the range of from about 20,000 to about 150,000, and preferably from about 30,000 to about 70,000. The molecular weight of the polyarylates is generally dependent on the amount of the amide precursor employed. Generally, the larger the amount of the amide precursor present the lower the molecular weight. Conversely, the smaller the amount of the amide precursor employed the higher the molecular weight of the resultant polyarylate resin.

The amount of the amide precursor employed is a chain terminating amount. By chain terminating amount is meant an amount effective to terminate the chain length of the polymer before the molecular weight of the polymer becomes too high and consequently the polyarylate polymer becomes too viscous for any practical application, but insufficient to terminate the polymer chain before an arylate polymer of useful molecular weight is formed. Generally, this amount ranges from about 0.1 to about 10 mole percent based on the amount of the aromatic dicarboxylic acid present, and preferably from about 1 to about 7 mole percent.

In carrying out the instant invention only one amide precursor may be used. In this case substantially all of the end or terminal groups will be the same. Alternatively, a mixture of two or more different amide precursors may be employed. In this instance a statistical mixture of arylate polymers containing different amide end or terminal groups will result. By statistical mixture is meant a mixture of polymers wherein some of the polymers will be terminated with the same terminal groups while some of the polymers will be terminated with two different amide terminal groups, assuming that a mixture of two different amide precursors is employed. The amounts of the different amide terminal groups present will depend upon the amounts and relative reactivities of the respective amide precursors employed.

Additionally, the amide precursors of the instant invention may be used in conjunction with the conventional known chain terminating agents such as phenol, paratertiarybutyl phenol, and Chroman-I. In such case a statistical mixture of polymers containing different terminal groups will be formed. The amounts of the various terminal groups present will depend on the relative amounts and relative reactivities of the various chain terminating agents used.

The preparation of the instant polyarylates may be accomplished by known methods such as heterogeneous interfacial polymerization, solution condensation polymerization, melt condensation polymerization, and the like.

Most conveniently, the instant polyarylates may be prepared from equimolar or nearly equimolar amounts of at least one dihydric phenol and at least one aromatic dicarboxylic acid or an ester forming reactive derivative thereof via the interfacial polymerization technique. In accordance with the usual interfacial polymerization procedure the reactants are present in different liquid phases which are immiscible and which constitute two solvent media. Thus, the dihydric phenol is dissolved in one solvent medium, the aromatic dicarboxylic acid or its ester forming reactive derivative is dissolved in the other solvent medium immiscible with the first, and the solutions are combined. Normally, an alkaline aqueous medium serves as the solvent for the dihydric phenol, and an organic solvent is utilized for the acid or its ester forming reactive derivative, said organic solvent being so chosen that it either dissolves the polyarylate produced or acts as a swelling medium therefor.

Also present during the reaction are catalysts and the amide precursor. The amide precursor may be added to the reaction mixture before the polyarylate forming reaction has begun, during the polyarylate forming reaction, or after the formation of the polarylate, in which case it functions mostly as an end capping agent.

The catalysts which may be employed in the interfacial polymerization process may be any of the well known catalysts conventionally used in said process. Suitable catalysts include, but are not limited to, tertiary amines such as triethylamine, quaternary ammonium compiunds, and quaternary phosphonium compounds.

The temperature at which the interfacial polymerization recation proceeds may vary from below 0° C. to above 100° C. The reaction proceeds rather satisfactorily at temperatures from room temperature (25° C.) to about 50° C.

The importance of chain terminating or end capping polyarylate resins by means of certain molecular weight regulating or chain terminating compounds is well known. The absence of chain terminating or molecular weight regulating agents during the preparation of the polyarylates results in polymers with a molecular weight that is often so high that the polymers are too viscous to mold at reasonable temperatures.

Standard chain terminating agents employed in the preparation of polyarylates include the members of the monohydric phenol family such as phenol itself and p-tertiarybutyl phenol. However, the field of chain terminators and their effects upon the properties of polyarylates is generally not completely understood and is one wherein the empirical approach is generally the rule rather than the exception in determining whether a particular compound or class of compounds will function effectively as chain terminators for polyarylates. Thus, for example, while a particular compound may function effectively as a chain terminator for polyarylates, another similar compound or class of compounds may be ineffective in terminating the polyarylate polymer chain. This area is further complicated by the fact that not only must a particular compound function as a chain terminator, but this compound when incorporated into the polyarylate polymer as a terminal group must not adversely affect the positive and advantageous properties of the polyarylate. Thus, while some compounds may be effective chain terminators for polyarylates they may not be practical since they have an adverse effect upon the advantageous mechanical and physical properties of the polyraylate resins.

As mentioned hereinafore the chain terminating compounds utilized in the process of the instant invention may be comprised of a mixture of at least one amide precursor and at least one conventional chain terminating agent such as phenol itself, p-tertiarybutyl phenol, and Chroman-I. When a mixture of the amide precursor and a conventional chain terminating agent is employed it is preferred that this mixture generally contain from about 25 to about 75 mole percent of at least one amide precursor, based on the total amounts of amide precursor and conventional chain terminating agent present. In the case where phenol is used as the chain terminating agent in conjunction with the amide precursors of the instant invention the resultant arylate polymers will contain the amide terminal groups of Formula IV and phenyl ester terminal groups represented by the formula

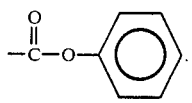

The amounts of the respective terminal groups present will be dependent upon the amounts and relative reactivities of the respective chain terminating agents employed.

The polyarylates of the instant invention may optionally have admixed therewith the various commonly known and used additives. These additives include, but are not limited to, antioxidants; anti-static agents; inert fillers such as clay, talc, mica, and glass; ultraviolet radiation absorbers such as the benzophenones and the benzotriazoles; hydrolytic stabilizers such as the epoxides disclosed in U.S. Pat. Nos. 3,489,716, 4,138,379 and 3,839,247, all of which are incorporated herein by reference; color stabilizers such as the organophosphites disclosed in U.S. Pat. Nos. 3,305,520, 4,118,370 and 4,138,379, all of which are incorporated herein by reference; and flame retardants.

Some particularly useful flame retardants are the alkali and alkaline earth metal salts of sulfonic acids. These types of flame retardants are disclosed in U.S. Pat. Nos. 3,933,734, 3,931,100, 3,974,024, 3,948,851, 3,926,908, 3,919,167, 3,909,490, 3,953,396, 3,953,399, 3,917,559 and 3,940,366, all of which are incorporated herein by reference.

DESCRIPTION OF THE PREFERRED EMBODIMENT

The following examples are set forth to further illustrate the present invention, and are not to be construed as limiting the invention thereto. These examples are set forth by way of illustration and not limitation. Unless otherwise specified, all parts and percentages are percentages or parts by weight.

The following example illustrates a conventional prior art polyarylate falling outside the scope of the instant invention. This example is presented for comparative purposes only.

EXAMPLE 1

To a slurry of 22.8 grams (0.1 mole) of bisphenol-A, 0.28 milliliter (2 mole %) of triethylamine, 0.2 gram (2 mole %) of phenol, 500 milliliters of methylene chloride, and 300 milliliters of water, there is added sufficient 25% aqueous sodium hydroxide solution to bring the pH to 11. At a pH of 11 a solution of 20.3 grams (0.1 mole) of isophthaloyl dichloride dissolved in 30 milliliters of methylene chloride is added during a 5 minute period, followed by stirring for one hour. The methylene chloride phase is separated, washed with 0.01N hydrochloric acid, and washed twice with distilled water. The organic phase is then separated, dried by silica gel, and filtered. The polymer is precipitated from the methylene chloride solution with methanol and dried.

The second order glass transition temperatures (Tg) of the polymer are determined by using a Perkins-Elmer DSC-2B instrument which measures the second order glass transition temperature by differential scanning calorimetry.

Also determined is the percent light transmission.

The polymer is compression molded at 600° F. into test bars of about 2½ in. by about ½ in. by about 1/16 in. thick. These tests bars are subjected to the flame-retardancy test procedure set forth in Underwriters' Laboratories, Inc. Bulletin UL-94, Burning Test for Classifying Materials. In accordance with this test procedure, materials that pass the test are rated V-O, V-I or V-II based on the results of 5 specimens. The criteria for each V (for vertical) rating per UL-94 is briefly as follows:

"V-O": Average flaming and/or glowing after removal of igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ⅛" of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by standards of the invention, as "burns". Further, UL-94 requires that all test bars in each test group must meet the V-type rating to achieve the particular classification, otherwise, the 5 bars receive the rating of the worst single bar. For example, if one bar is classified as V-II and the other 4 bars are classified as V-O, then the rating of all bars is V-II.

The results of these aforedescribed tests are set forth in Table I.

The following example illustrates a polyarylate of the instant invention.

EXAMPLE 2

To a slurry of 22.8 grams (0.1 mole) of bisphenol-A, 0.28 milliliter (2 mole %) of triethylamine, 500 milliliters of methylene chloride, and 300 milliliters of water, there is added sufficient 25% aqueous sodium hydroxide solution to bring the pH to 11. At a pH of 11 a solution of 20.3 grams (0.1 mole) of isophthaloyl dichloride dissolved in 30 milliliters of methylene chloride is added dropwise during a 5 minute period, followed by stirring for 20 minutes. To this reaction mixture is then added 0.16 gram (2 mole %) of methylamine in the form of a 40% aqueous solution. Stirring is then continued for one hour. The methylene chloride phase is separated from the brine phase, washed with 0.01N hydrochloric acid, and washed twice with distilled water. The organic phase is then separated, dried with silica gel, and filtered. The polymer is precipitated with methanol and dried.

The polymer is compression molded into test bars as set forth hereinafore.

The Tg, % light transmission and flame-retardancy are determined, and the results are set forth in Table I.

TABLE I

| Example No. | Tg (°C.) | % Light Transmission | UL-94 |
|---|---|---|---|
| 1 | 191.4 | 88.2 | V-I |
| 2 | 191.8 | 88.6 | V-O |

As illustrated by the data in Table I, particularly the results of UL-94, it is apparent that the polyarylates of the instant invention exhibit improved thermal characteristics than conventional prior art polyarylates.

Obviously, other modifications and variations of the present invention are possible in light of the above teachings. It is, therefore, to be understood that changes may be made in the particular embodiments of the invention described which are within the full intended scope of the invention defined by the appended claims.

What is claimed is:

1. Polyarylate comprised of recurring aromatic ester units containing at least one amide terminal group represented by the general formula

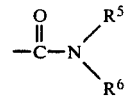

wherein $R^5$ and $R^6$ are hydrogen.

2. The polyarylate of claim 1 which is comprised of the polymeric reaction products of (i) at least one dihydric phenol, (ii) at least one aromatic dicarboxylic acid or an ester forming reactive derivative thereof, and (iii) a chain terminating amount of at least one amide precursor selected from ammonia or ammonium compounds which liberate ammonia.

3. The polyarylate of claim 2 wherein said ester forming reactive derivative of said aromatic dicarboxylic acid is selected from terephthaloyl dihalides, isophthaloyl dihalides, or mixtures thereof.

4. The polyarylate of claim 3 wherein said ester forming reactive derivative of said aromatic dicarboxylic acid is selected from isophthaloyl dichloride, terephthaloyl dichloride, or mixtures thereof.

* * * * *